United States Patent [19]

Hopper, Jr.

[11] Patent Number: 4,488,673
[45] Date of Patent: Dec. 18, 1984

[54] DIRECT METAL BRAZING TO CERMET FEEDTHROUGHS

[75] Inventor: Albert C. Hopper, Jr., St. Petersburg, Fla.

[73] Assignee: The United States of America as represented by the United States Department of Energy, Washington, D.C.

[21] Appl. No.: 403,219

[22] Filed: Jul. 29, 1982

[51] Int. Cl.³ .............................................. B23K 1/12
[52] U.S. Cl. .................................... 228/122; 228/903
[58] Field of Search ............... 228/122, 123, 124, 903; 174/68.5, 94 R

[56] References Cited

PUBLICATIONS

IBM Technical Disclosure Bulletin, *Via Hole Filling Techniques*, vol. 12, No. 4, Sep. 1969, F. W. Eurglunes.
IBM Technical Disclosure Bulletin, *Charge Method for Multilayer Printed Circuit Card*, vol. 11, No. 11, Apr. 1969, Chellis, Ellis and Hermann.
IBM Technical Disclosure Bulletin, Process for Forming Interconnection Contact Terminals in a Multilayer Ceramic Substrate, vol. 25, No. 7A, Dec. 1982, Desai, Melvin, Milkovich, and Urfer.
IBM Technical Disclosure Bulletin, Diffusion Process for Improved Ceramic-to-Metal Bond, vol. 26, No. 8, Jan. 1984, J. F. Sullivan.

*Primary Examiner*—Kenneth J. Ramsey
*Assistant Examiner*—M. Jordan
*Attorney, Agent, or Firm*—Armand McMillan; Albert Sopp

[57] ABSTRACT

An improved method for brazing metallic components to a cermet surface in an alumina substrate eliminates the prior art metallized layer over the cermet via and adjoining alumina surfaces. Instead, a nickel layer is applied over the cermet surface only and metallic components are brazed directly to this nickel coated cermet surface. As a result, heretofore unachievable tensile strength joints are produced. In addition, cermet vias with their brazed metal components can be spaced more closely in the alumina substrate because of the elimination of the prior art metallized alumina surfaces.

8 Claims, 2 Drawing Figures

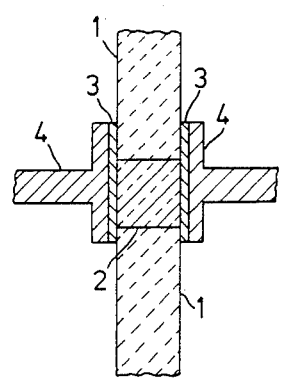
FIG. IA
PRIOR ART
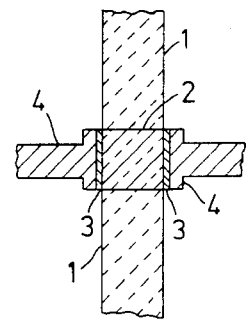
FIG. IB

DIRECT METAL BRAZING TO CERMET FEEDTHROUGHS

The U.S. Government has rights in this invention pursuant to Contract No. DE-AC04-76DP00656 between the U.S. Department of Energy and General Electric Company.

BACKGROUND OF THE INVENTION

State of the art electrical feedthroughs for alumina substrates, e.g., vacuum tubes are often made through cermet "vias". A via is a homogeneous conductive alumina path through an alumina insulator, typically comprising a conventional moly-manganese coating. The vias are of defined extent in the alumina substrate. See, FIG. 1a.

In brazing a metal lead to the alumina substrate, heretofore an intermediate metallized pad (e.g., molymanganese), was required between the cermet via/alumina substrate and the metal component to be brazed thereto. This metallized pad covered not only the cermet via surface, but also extended beyond its dimensions to permit subsequent brazing to the insulating alumina surface itself. The braze to the alumina surface provided additional strength, and in fact the primary strength, while the braze to the cermet via provided electrical contact.

The resultant metal/alumina bonds were not completely satisfactory. Often the metal connectors fell off during handling operations. Sample strength was limited since it was derived solely from the area of the brazed joint located on the alumina substrate. The braze area on the cermet via contributes little or no strength to the braze joint. Typical tensile strengths were about 9,000 psi or less.

Another disadvantage of the state of the art process and resultant products resides in a relatively restricted design flexibility due to the additional bulk caused by the overlap area extending beyond that necessary solely for electrical contact with the cermet via per se. Where space is at a premium, which is often the case in electronic systems, this is a significant drawback.

Furthermore, the metallization step per se adds significant cost to the entire operation and further complicates it.

Although many methods have been employed to braze metal components to various ceramic substrates, heretofore, a solution to the problem defined above has not been suggested. A representative sampling of United States patents disclosing various aspects of prior art methodology in this area include the following: U.S. Pat. Nos. 3,402,458; 3,146,514; 3,548,345; 3,874,069; 4,278,195; and 3,203,084.

SUMMARY OF THE INVENTION

Accordingly, it is an object of this invention to provide a new method for direct metal brazing to cermet feedthroughs which overcomes or significantly ameliorates the foregoing disadvantages.

It is another object of this invention to provide such a method which achieves higher tensile strength bonds between metal components and cermet vias in alumina substrates.

It is another object of this invention to provide new alumina substrates containing cermet vias to which are brazed metal components, the tensile strength of the braze joints being significantly higher than those of the prior art.

Upon further study of the specification and appended claims, further objects and advantages of this invention will become apparent to those skilled in the art.

These objects have been attained by providing, in a method of brazing a metal component to a cermet via surface of an alumina substrate, comprising (a) cleaning the cermet via surface to be brazed, (b) applying a metallized layer over the cermet via surface to be brazed and over the adjoining alumina substrate, and (c) brazing a metal component to the metallized area, the improvement wherein step (b) consists essentially of applying a nickel layer over the cermet via surface but substantially not beyond said surface onto the alumina substrate.

In another aspect, these objects have been achieved by providing an alumina substrate having a metal component brazed thereto, comprising, an alumina substrate having a cermet via surface therein, a nickel layer covering said cermet via surface but substantially not extending over said alumina substrate, and a metal component brazed to said nickel coated cermet via surface.

In a preferred version of this invention, the metal component covers substantially all of the nickel coated via surface but does not substantially extend beyond the via surface onto the insulating alumina substrate.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIGS. 1a and 1b present in cross-section, a physical comparison of the state of the art braze joint (a) and that of this invention (b).

DETAILED DISCUSSION

The present invention enables high tensile strength brazing of metal components, e.g., electrodes, leads, etc. to cermet substrates such as electrical feedthrough vias. Most importantly, this is achieved with a concomitant elimination of the heretofore required metallized pad extending over the cermet via and onto the surrounding alumina area. The elimination of the metallized pad is highly advantageous since the vias can be more closely spaced because of the significantly smaller surface area required by the direct cermet/metal joint of this invention. This is most important where space is at a premium. For example, in a typical feedthrough design afforded by this invention, vias can be spaced only 0.020 inches apart or even less.

Of course, elimination of the additional metallization step prior to the actual brazing also represents a significant economic advantage. It also substantially simplifies the process, thereby minimizing associated difficulties, and, accordingly, increasing reproducibility and the yield of acceptable products and decreasing quality control problems. Furthermore, the repeated firings of the via are no longer necessary. These were previously needed in multiple metallized-layer applications. This enables further reduction in time and money expenditures and eliminates the attendant loss of joint strength.

The standard via brazed joint of the prior art and the improved via brazed joint of this invention can be visualized more clearly by referring to FIGS. 1(a) and 1(b) which show, in cross-section, an alumina substrate 1 through which passes a cermet via 2. The via 2 is brazed on both its outer exposed surfaces to conductors 4 after being coated with metallized layers 3. It should be noted that the metallized layers 3 are essentially restricted to the via surfaces in FIG. 1(b), while in the prior art article 1(a), they extend beyond that to the ajoining alumina substrate surfaces.

The tensile strength of the products of this invention are significantly higher than those produced by prior art processes. For example, tensile strengths of about 18,500±2100 psi can readily be achieved, as compared to prior art values of 9,000 psi or less. The primary reason for this significant and unexpected superiority is that the prior art sample strength depends essentially solely on the area of the brazed joint located over the alumina substrate, as mentioned above. The area over the cermet via provides little or no strength, it is believed, because of a deterioration in the ability of the cermet via to provide a strong braze bond to the metal due to chemical effects of the prior art metallization step. Elimination of the prior art metallization by the surprising discovery that simple nickel plating over the cermet via is effective, not only contributes bond strength from the cermet via region, but also eliminates the need for an additional brazed area outside the perimeter of the via surface.

With respect to the foregoing and subsequent discussion, reference should be made to FIGS. 1a and 1b which dramatically illustrate the significant difference between the state of the art braze joint and the braze joint of this invention.

In essence, the present invention is based upon the discovery that by directly providing a nickel or equivalent metal coating over the cermet via surface, metal components can be directly bonded thereto to provide a high strength braze joint as well as electrical conductivity. There is no longer any need to braze directly to the alumina substrate or to employ metal components having a surface area larger than that of the cermet feedthrough. This nickel plating step per se can be conducted in accordance with any nickel plating technique from the many which are conventionally employed to provide a nickel plate coating on ceramic or cermet surfaces. Most typically, a nickel-containing layer is electroplated onto the cermet via and this is followed by a fully conventional sinter vacuum firing step. The thickness of the nickel plate is not critical. It must simply be satisfactory for enabling a high tensile strength bond between the cermet via and the metal component. Where necessary, optimum thicknesses can be readily determined by routine preliminary experiments. Typically, thicknesses will be in the 0.0005 to 0.001 inch range. The precise electroplating method used to achieve the nickel-containing layer on the cermet via is also not critical. For example, a conventional "Watts" bath can be employed (See, e.g., GE Drawing No. SS 27014, whose disclosure is incorporated by reference herein. All GE Drawings mentioned herein are publically available, e.g., from General Electric, St. Petersburg, Fla. 33733.), or a nickel oxide layer can be screen printed onto the cermet via in fully conventional fashion. In any case, the subsequent sinter/vacuum firing will achieve the necessary metallic nickel layer.

As for the details of the nickel plating step per se, the details of the preceeding cleaning steps and subsequent brazing steps are fully conventional. A selection of the optimum method to employ in any given situation can be readily made again using conventional considerations and routine preliminary experiments where necessary. The same techniques used to prepare the inferior prior art braze joints can be used in this regard.

For example, it is preferred that mechanical means be used to clean the cermet via surface. One typical method is microblasting with an S. S. White microblaster using Airbrasive No. 3 grit or equivalent. The purpose of this or any equivalent treatment is to remove any surplus alumina from the via surface as well as any inadvertently formed layers resulting from the previous molybdenum treatment used to prepare the cermet via. Mechanical methods also rough up the surface optimizing adhesion of the nickel layer. Chemical cleaning methods, such as chemical etching, can also be employed. However, these are not preferred since they tend to contaminate the ceramic surfaces. In any case, as is fully conventional, it is found helpful to subsequently ultrasonically clean the via to remove the ubiquitous contaminants such as dust, fingerprints, etc. A typical technique is that of GE Drawings 46A100662 or 46A100663, both of which are incorporated by reference herein.

The subsequent brazing step is carried out, in essence, precisely as before. The only difference resides in the fact that brazing to the cermet via surface alone is all that is required for this invention, thereby enabling the use of smaller metallic leads and smaller brazed joint areas. For example, the braze can be made between the nickel plated via surface and any desired metal such as a matching coefficient of expansion lead comprising Kovar, Rodar, etc. Suitable brazing metals for effecting the braze joint include all of those which are conventional, such as copper, palniro, copper-nickel, copper-silver, copper-gold, copper-silver-palladium, and the many others which are conventionally known to wet both the metal component and the cermet via. Good brazing practices are thereafter followed, typically involving a firing of the assemblage in accordance with a conventionally predetermined heating schedule in a hydrogen atmosphere. Details will be selected taking into account the usual parametric considerations of good brazing practice, e.g., in dependence of the mass involved, the configuration employed, the chemical composition of all components, etc. As usual, the firing time and temperature must be sufficient to allow complete alloying of the component materials when molten.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

EXAMPLE

Any inadvertently formed insulating layers drived from the previous molybdenum treatment were removed from the cermet via surface by microblasting with an S. S. White microblaster using Airbrasive No. 3 grit. The surplus abrasive was removed by treatment with a jet air stream (30–40 psig). The cermet surface was then ultrasonically cleaned in accordance with GE Drawing 46A100663. The cleaned cermet via surface were nickel plated using a standard "Watts" bath, a current density of 575 mA/in.$^2$ at a temperature of 50°–75° C. Thereafter, the nickel plated cermet via surface was sintered using a standard time temperature process. The procedures of GE Drawing No. SS277014, whose disclosures are incorporated by reference herein, were employed; which describe in detail the above processes. The metal component to be brazed to the via was of a slightly smaller diameter than the via. A layered assembly was prepared consisting of the cermet via, a suitable braze washer thereover and the metal being brazed to the via on top of that. The combination was assembled in a conventional brazing fixture. The braze washer was a copper disc of a diameter of 0.035 in. and a thickness of 0.001 in.; the lead was made of Kovar and had a diameter of 0.035 in.; and the via had a diameter of 0.040 in. The assembly was brazed in a reducing atmospheric furnace (Sargeant-Wilbur Model AAC060836). 550 cubic feet per hour of dry hydrogen flowed through the furnace at a temperature of 1160° C. A belt speed of 1.5 inches per minute produced satisfactory brazing times.

Fourteen connectors fabricated in accordance with the foregoing procedure were subjected to Tinnius-Olsen tensile strength tests. The results showed a calculated tensile strength of 18,500±2100 psi for the joint. In such a test, this represents an extremely narrow dispersion band for fourteen samples and demonstrate the high reproducibility achieved. In all tests, the brazed joint was found to be stronger than the inherent strength of the bulk via material since all vias fractured before the braze joint.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of brazing a metal component to an exposed outer surface of a cermet via in an alumina substrate, which comprises (a) cleaning the cermet via surface to be brazed, (b) applying a metallized layer, and (c) brazing a metal component to the metallized area, the improvement wherein, step (b) consists essentially of applying a nickel layer over the cermet via surface but substantially not beyond said surface onto the alumina substrate.

2. A method of claim 1 wherein the metal component brazed to the cermet via is in direct contact with the cermet via only and not the alumina substrate.

3. A method of claim 1 or 2 wherein the cermet surface is cleaned by mechanical means in step (a).

4. A method of claim 1 or 2 wherein the nickel layer thickness is about 0.0005 to about 0.001 inch.

5. A method of claim 1 comprising;

cleaning the cermet via surface by microblasting; applying a 0.0005 to 0.001 inch nickel layer to the cermet via surface by electroplating followed by sinter vacuum firing at about 650° C. for at least one hour; and brazing a metal lead to the nickel plated cermet via, the lead not extending beyond the surface of the cermet via.

6. An alumina substrate having a metal component brazed thereto, comprising, an alumina substrate having an exposed cermet via surface thereon, a nickel layer covering said cermet via surface but substantially not extending over said adjoining alumina substrate, and a metal component brazed to said nickel coated cermet via surface.

7. An alumina substrate of claim 6 wherein said brazed metal component covers substantially all of said nickel coated cermet via surface but substantially does not extend beyond said surface.

8. An alumina substrate of claim 6 wherein said metal component is an electrical lead.

* * * * *